United States Patent
Masen et al.

(10) Patent No.: US 11,536,375 B2
(45) Date of Patent: Dec. 27, 2022

(54) VALVE SEAT WITH SEAL FOR USE WITH VALVE ELEMENT IN VALVE ASSEMBLY

(71) Applicant: Maxitrol Company, Southfield, MI (US)

(72) Inventors: Mark Geoffrey Masen, Leonard, MI (US); Jason Sagovac, Dearborn, MI (US)

(73) Assignee: MAXITROL COMPANY, Southfield, MI (US)

( * ) Notice: Subject to any disclaimer, the term of this patent is extended or adjusted under 35 U.S.C. 154(b) by 33 days.

(21) Appl. No.: 17/326,425

(22) Filed: May 21, 2021

(65) Prior Publication Data

US 2021/0364092 A1 Nov. 25, 2021

Related U.S. Application Data

(60) Provisional application No. 63/044,441, filed on Jun. 26, 2020, provisional application No. 63/028,244, filed on May 21, 2020.

(51) Int. Cl.
*F16K 1/46* (2006.01)
*F16K 1/226* (2006.01)
(Continued)

(52) U.S. Cl.
CPC .............. *F16K 1/465* (2013.01); *F16K 1/14* (2013.01); *F16K 1/2263* (2013.01); *F16K 1/54* (2013.01); *F16K 27/0245* (2013.01)

(58) Field of Classification Search
CPC ........ F16K 1/222; F16K 1/2263; F16K 1/427; F16K 1/425; F16K 1/465; F16K 1/46;
(Continued)

(56) References Cited

U.S. PATENT DOCUMENTS 3,270,772 A * 9/1966 Rakus .................. F16K 5/0615
137/553
3,329,398 A 7/1967 Goldsmith
(Continued)

FOREIGN PATENT DOCUMENTS

AU 671425 B2 8/1996
CN 109595355 A 4/2019
(Continued)

OTHER PUBLICATIONS

T-Lon Products, "T-Smart PTFE Specification Sheet", Jan. 2016, 4 pages.
(Continued)

*Primary Examiner* — Hailey K. Do
(74) *Attorney, Agent, or Firm* — McDonald Hopkins LLC

(57) ABSTRACT

A valve assembly includes a valve body defining a fluid inlet in fluid communication with a fluid outlet. The valve body has an inner body surface defining an interior chamber extending between the fluid inlet and the fluid outlet. A valve element is disposed within the interior chamber and rotatable through a range of positions relative to the outlet providing a high level of precision control of a fluid flow rate through the valve assembly. A valve seat with a seal is positioned around a valve element. The valve seat is configured to self-adjust its inner radial diameter to correspond to the outer radial diameter of the valve element to maintain a portion of an inner seat surface in contact with an outer valve surface of the valve element through the range of positions.

20 Claims, 11 Drawing Sheets

(51) Int. Cl.
  *F16K 27/02* (2006.01)
  *F16K 1/14* (2006.01)
  *F16K 1/54* (2006.01)

(58) Field of Classification Search
  CPC .... F16K 1/54; F16K 27/0218; F16K 27/0272; F16K 27/067; F16K 27/0245
  See application file for complete search history.

(56) References Cited

U.S. PATENT DOCUMENTS

| | | | |
|---|---|---|---|
| 3,778,028 A | | 12/1973 | Graves et al. |
| 4,067,352 A | * | 1/1978 | Halpine ................ F16K 1/2263 251/306 |
| 4,348,006 A | * | 9/1982 | Schmitt ............... F16K 27/0218 251/366 |
| 4,998,708 A | * | 3/1991 | Pavanel ................ F16K 1/2263 251/317 |
| 5,711,510 A | * | 1/1998 | Stary ..................... F02B 37/025 277/510 |
| 9,103,450 B2 | | 8/2015 | Street et al. |
| 9,810,338 B2 | | 11/2017 | Carter |
| 10,302,204 B2 | | 5/2019 | Masen et al. |
| 2009/0039305 A1 | * | 2/2009 | Shakagori ............ F16K 1/2265 251/306 |
| 2018/0283562 A1 | | 10/2018 | Buck |
| 2019/0368620 A1 | | 12/2019 | Masen et al. |

FOREIGN PATENT DOCUMENTS

| | | |
|---|---|---|
| DE | 3205025 A1 | 7/1983 |
| DE | 2807913 C2 | 6/1987 |
| DE | 3723542 A1 | 1/1989 |
| DE | 3819924 C2 | 5/1997 |
| EP | 0822358 A1 | 2/1998 |
| FR | 2616874 A1 | 12/1988 |
| GB | 1402846 A | 8/1975 |
| JP | 2001327622 A | 11/2001 |
| WO | 9307408 A1 | 4/1993 |
| WO | 2015170771 A1 | 11/2015 |

OTHER PUBLICATIONS

English language abstract and machine-assisted English translation for CN 109595355 A extracted from espacenet.com database on May 26, 2021, 8 pages.
English language abstract and machine-assisted English translation for DE 3205025 A1 extracted from espacenet.com database on May 26, 2021, 8 pages.
English language abstract and machine-assisted English translation for DE 2807913 C2 extracted from espacenet.com database on May 26, 2021, 4 pages.
English language abstract and machine-assisted English translation for DE 3723542 A1 extracted from espacenet.com database on May 26, 2021, 6 pages.
Machine-assisted English translation for DE 3819924 C2 extracted from espacenet.com database on May 26, 2021, 4 pages.
English language abstract and machine-assisted English translation for FR 2616874 A1 extracted from espacenet.com database on May 26, 2021, 7 pages.
English language abstract and machine-assisted English translation for WO 2015/170771 A1 extracted from espacenet.com database on May 26, 2021, 29 pages.
English language abstract and machine-assisted English translation for EP 0 822 358 A1 extracted from espacenet.com database on Oct. 18, 2021, 6 pages.
English language abstract and machine-assisted English translation for JP 2001-327622 A extracted from espacenet.com database on Oct. 18, 2021, 7 pages.

* cited by examiner

US 11,536,375 B2

VALVE SEAT WITH SEAL FOR USE WITH VALVE ELEMENT IN VALVE ASSEMBLY

RELATED APPLICATIONS

This application claims priority to and the benefit of U.S. Provisional Patent Application No. 63/028,244 filed on May 21, 2020, and U.S. Provisional Patent Application No. 63/044,441, filed on Jun. 26, 2020, the contents of which are hereby incorporated herein by reference in their entirety.

BACKGROUND OF THE INVENTION

1. Field of the Invention

The present disclosure relates, generally, to fluid flow control and, more specifically, to a valve assembly having a valve seat with a seal for use with a valve element.

2. Description of the Related Art

Fluid control systems use a variety of valve types to turn fluid flow on and off, and also to modulate the flow rate through a fluid circuit. Conventional control systems may include valves having complex mechanisms including many components and complicated assembly. These valves may suffer from a lack of fine precision control and require a larger volume within the fluid circuit.

There remains a need for improved valves for use in fluid control systems that have a simple, compact design for a given maximum flow rate (flow rate of gas at which a reasonable drop of pressure is observed), thereby enabling easy assembly and a high precision control of flow rate. A valve which causes the least amount of pressure drop at a given flow rate can be sold to a wider range of applications, or specifically, can be used where supply pressures are lower, or packaging concerns can be overcome. Control over bypass flow when a valve is in its most closed position is a particular need that has not been provided prior to the present disclosure.

SUMMARY OF THE INVENTION

The present disclosure overcomes the disadvantages in valve assemblies by providing a valve seat with a seal for use with a valve element to control fluid flow in a valve assembly.

The valve assembly includes a valve body defining a fluid inlet in fluid communication with a fluid outlet, with the valve body having an inner body surface defining an interior chamber extending between the fluid inlet and the fluid outlet. The valve assembly also has a control shaft disposed in the interior chamber and coupled to the valve body for rotational movement relative to the valve body, and a valve element disposed in the interior chamber and coupled to the control shaft for movement in conjunction with the control shaft relative to the valve body through a range of positions between and including a closed position and an open position, with the valve element having an outer valve surface defining an outer radial diameter.

The valve assembly also includes a valve seat disposed in the interior chamber that includes a cylindrical body portion having an inner seat surface and an opposing outer seat surface, the cylindrical body portion defining a clearance hole extending from the inner seat surface and the opposing outer seat surface for receipt of the control shaft, with the inner seat surface defining an inner radial diameter, and with at least one seal disposed around the opposing outer seat surface sealingly coupling the valve seat to the valve body. The cylindrical body portion is formed from a polymeric material which maintains dimensional stability at temperatures ranging from −40° C. to 66° C. and which is configured to self-adjust the inner radial diameter to correspond to the outer radial diameter of the valve element to maintain a portion of the inner seat surface in contact with the outer valve surface of the valve element through the range of positions.

The present disclosure is also directed to the associated valve seat for use in the valve assembly as described above that tightens the flow around the valve element while still permitting a control shaft to control the valve element. The valve seat with the seal is always in contact with the valve element to widen the sealing capabilities over a wider temperature range and greater functionality of the valve assembly.

This valve assembly is also included in an improved method of fluid control using the valve assembly as described above. The method includes the step of moving the valve element from a first position of the range of positions to a second position of the range of positions to achieve a desired flow of fluid in the interior chamber between the valve element and the valve seat and between the fluid inlet and fluid outlet, wherein the inner radial diameter of the valve seat is self-adjusted during the moving of the valve element to maintain a portion of the inner seat surface in contact with the outer surface of the valve element as the valve element moves through the range of positions between the closed and open positions.

BRIEF DESCRIPTION OF THE DRAWINGS

Other objects and advantages of the present disclosure will be readily appreciated as the same becomes better understood after reading the subsequent description taken in connection with the accompanying drawings, wherein.

DETAILED DESCRIPTION OF THE INVENTION

Figure 1:
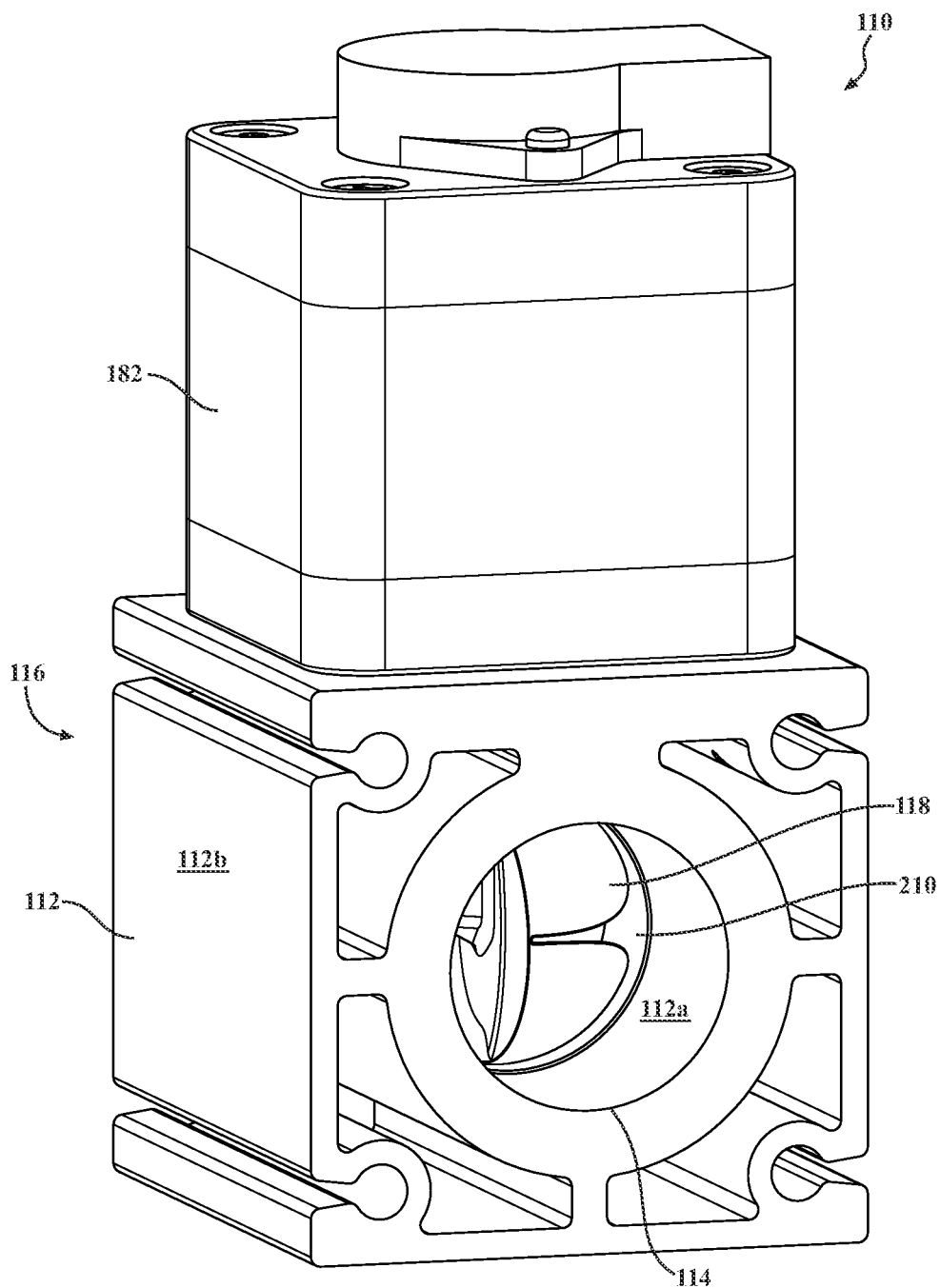
FIG. 1 shows an exemplary embodiment of a valve assembly with a seat with a seal according to the present disclosure.
Figure 2:
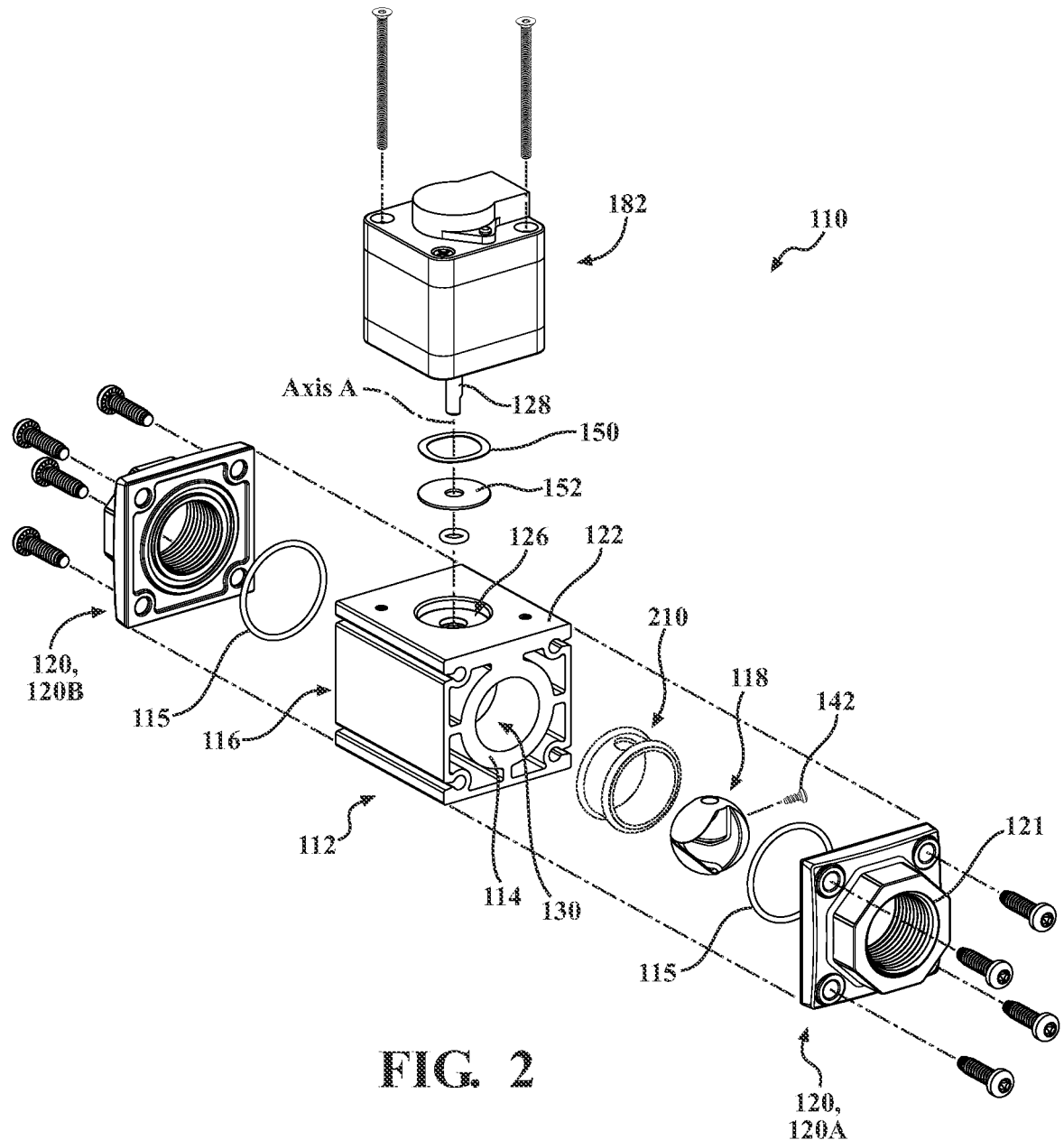
FIG. 2 shows an exploded view of the valve assembly of FIG. 1.

Referring to FIGS. 1 and 2, one exemplary embodiment of a valve assembly 110 in accordance with the present disclosure is illustrated in an assembled and exploded view. The valve assembly 110 includes a valve body 112 that can be installed into a fluid circuit to provide flow control. The valve body 112 may define an interior chamber 130. More precisely, the valve body 112 includes an inner body surface 112a which defines an interior chamber 130 and an opposing outer body surface 112b that defines the outer periphery of the valve body 112.

The valve body 112 may also include, or otherwise define, a fluid inlet 114 and a fluid outlet 116 in fluid communication with the interior chamber 130 and configured to facilitate fluid flow along a fluid flow pathway through the valve body 112. In particular, separate openings that are defined at the intersection of the inner body surface 112a and outer body surface 112b of the valve body 112 may define the fluid inlet 114 and fluid outlet 116, The rate of fluid flow through the valve body 112 may be modulated by a valve element 118, sometimes alternatively referred to as a flow control gate 118, disposed in the interior chamber 130 of the valve body 112, with the valve element 118 positioned in the fluid flow pathway defined by a portion the interior chamber 130 directly in line between the fluid inlet 114 and the fluid outlet 116. In certain embodiments, such as shown in FIGS. 2-3 in one exemplary embodiment as will also be described further below, the valve element 118 is a spherical valve element 118, in that at least a portion of an outer surface 118a of the body 119 of the valve element 118 has a spherical profile and therefore can define an outer radial diameter of the valve element 118.

The valve assembly 110 also includes a valve seat 210 and one or more seals 240 coupled to the valve seat 210 with the valve seat 219 thereby maintaining contact with the valve element 118 thereby directing fluid flow through the intended control element and minimizing or eliminating uncontrolled "bypass" flow. Three alternative embodiments for the valve seat 210 including one or more seals 240 are illustrated in FIGS. 4-7, with each embodiment described in further detail below.

The valve body 112 defines the structure of the valve assembly 110, providing an enclosure to the fluid flow pathway secure against fluid leakage and enabling the valve assembly 110 to be integrated into a fluid circuit. The valve body 112 may be formed from a variety of materials appropriate to the intended function of the valve assembly 110, including consideration of the choice of fluid media to be communicated and the operating pressures and velocity for the fluid flow. For example, a high strength material, such as metal, may be selected to form the valve body 112 for the communication of high-pressure fluids. The material of the valve body 112, or other components of the valve assembly 110, may optionally be surface-treated to accommodate the communication of the fluid. For example, a surface treatment may be applied to a metal valve body for the communication of a corrosive fluid, or operation in a corrosive environment. Alternatively, the valve body 112 may be formed of a ceramic material, a plastic material, a composite material or other material known in the art to be suitable for constructing valve bodies.

The valve body 112 is formed through conventional fabrication processes appropriate to the material selected to form the valve body 112. For example, a metal valve body 112 may be formed through a process of casting, forging, or machining as appropriate to create the features of the valve body 112. The valve body 112 may be extruded and then machined as needed. Extrusion can provide a capital cost reduction over cast tooling. Additionally, extrusion may avoid common pitfalls of casting complex bodies, such as: porosity, voids, flash and cold shot. Alternatively, a plastic valve body 112 may be formed through a molding process or a deposition process.

The valve body 112 may be provided with attachment features 120 that can facilitate the mechanical retention of the valve body 112 to other components in a fluid circuit (not shown). The valve body 112 may comprise a series of parallel slots 124 and/or semi-circular channels including a retention feature configured to allow for coupling of the attachment feature 120 to the valve body 112. However, it is contemplated that the valve body 112 may be modified to incorporate any of a variety of attachment features 120 known in the art.

The valve body 112 may include one or more attachment features 120 (shown as a pair of attachment features 120A and 120B in FIG. 2) and may be secured to the valve body 112 and configured to couple and/or connect the valve body 112 to the fluid circuit through other means. For example, the one or more attachment features 120 may be coupled to the valve body 112 via welding, brazing, soldering, epoxy, adhesive, or the like. It is also contemplated that the one or more attachment features 120 may be removably coupled to the valve body 112 via screws, bolts, or a similar fastener. The attachment features 120 may also comprise a gasket or seal 115 disposed between the attachment features 120 and the valve body 112 when the attachment features 120 are coupled to the valve body 112. The gasket or seal 115 may be configured to provide a leak-proof seal between the attachment features 120 and the valve body 112.

The attachment features 120 may comprise an attachment portion 121 for the connecting attachment feature 120, and by extension the valve body 112, to the fluid circuit. For example, the attachment portion 121 may comprise threading configured to couple to a complementary threaded pipe or similar component of the fluid circuit. While not illustrated in the Figures, it is contemplated that the attachment portion 121 may be configured to couple to a pipe or similar component of the fluid circuit via welding, brazing, soldering or the like. The attachment features 120 may serve as a universal coupling feature allowing for a single size or style valve body 112 to be coupled to various sized, shaped, and/or types of fluid circuits. For example, using a first configuration of the attachment feature 120 including one style and/or size of attachment portion 121, such as ¾-inch threading, may allow the valve body 112 to be coupled to the fluid circuit. Alternatively, using a second configuration of the attachment feature 120 including an alternative style and/or size of attachment portion 121, such as a ½-inch receiver for brazing, may allow the same valve body 112 to be coupled to the fluid circuit requiring this form of coupling. The appropriate attachment features 120 or securement to incorporate the valve body 112 to the fluid circuit is selected according to knowledge and skill in the art based on the material and construction of the valve body 112 and the material of the fluid circuit components, as well as the fluid to be communicated and the operating pressure and flow rate of that fluid.

The valve body 112 may also include other advantageous features to integrate with other components in a fluid circuit. Contoured exterior surfaces at the inlet 114 and the outlet 116 may be radiused, or curved, to increase the overall surface area at the interface between the valve body 112 and another component. The attachment portion 121 of the attachment features 120 may similarly be radiused, or curved, to increase the overall surface area at the interface between the attachment features 120 and the valve body 112 and/or another component of the fluid circuit. When the valve assembly 110 is used in conjunction with a filter screen at the inlet 114 or outlet 116, this allows the surface area of the filter to be increased, thus improving filter performance and longevity, without requiring an increase in total cross-sectional area at the interface with the valve assembly. In certain embodiments, the attachment features 120 and 121 may further define, or otherwise extend, the fluid inlet 114 and the fluid outlet 116 for the valve beyond the intersection of the inner body surface 112a and outer body surface 112b of the valve body 112.

The valve assembly 110 may further include a force controller 182. The force controller 182 may be coupled to the valve body 112 and configured to manipulate the position and/or orientation of the valve element 118 that is disposed within the interior chamber 130 of the valve body 112. For example, the force controller 182 may be fixedly or removably mounted to an outer body surface 112b of the valve body 112, as illustrated in FIG. 1. Alternatively, it is also contemplated that the force controller 182 may be disposed within a compartment formed in the valve body 112. The force controller 182 may comprise a step motor, or similar mechanism capable of manipulating the position and/or orientation of the valve element 118 that is disposed within the interior chamber 130. For example, the force controller 182 may comprise a step motor configured to variably rotate the valve element 118 within the interior chamber 130 of the valve body 112.

The force controller 182 may further include a control shaft 128. The control shaft 128 may be at least partially disposed in the interior chamber 130 of the valve body 112 and configured to support and/or modulate the valve element 118 to manipulate the flow rate through the outlet 116 of the valve body 112. The control shaft 128 may extend from the force controller 182 and through an aperture 126 in the valve body 112 to engage the valve element 118 disposed within the interior chamber 130.

One or more gaskets or seals 150, 152 may be disposed between the force controller 182 and the valve body 112 when the force controller 182 and the valve body 112 are coupled together to form a generally leak-proof seal or barrier between the force controller 182 and the valve body 112. The one or more gaskets or seals 150, 152 may define an aperture 126 such that the gaskets or seals 150, 152 may at least partially surround the control shaft 128 of the force controller 182.

In operation, the force controller 182 operates to rotate the control shaft 128 and thereby position the valve element 118 within the interior chamber 130. Depending on the position of the valve element 118, the valve element 118 may completely seal against the valve seat 210 to seal/close the interior chamber 130, preventing any fluid from exiting the outlet 116. However, as the force controller 182 rotates the control shaft 128 (see FIGS. 9A-9D), and by extension rotates the valve element 118, it varies the amount that the valve element 118 is unsealed relative to the valve seat 210, and hence varies the amount of the interior chamber 130 that is exposed/opened, allowing fluid to flow through the valve assembly 110 and out the outlet 116 at varying rates. A high level of precision control may be achieved by selectively rotating the valve element 118 to occlude the valve element 118 with the valve seat 210, and hence occlude the desired portion of the interior chamber 130 to control fluid flow through the outlet 116.

Referring to FIGS. 3A-3D, one exemplary embodiment of the valve element 118 are illustrated for use with the valve assembly 110 described above.

The valve element 118 includes a body 119 having a first surface 131 and an opposing second surface 133. The valve element 118 may also include a coupling feature 140 for coupling the valve element 118 to the control shaft 128 of the force controller 182. The coupling feature 140 may include an aperture in the outer perimeter that extends into the body 119 of the valve element 118, such that the longitudinal axis, Axis-A, of the coupling feature 140 defines the axis about which the force controller 182 rotates the valve element 118. The coupling feature 140 may further include a retention feature 142, wherein the retention feature 142 may be configured to couple the valve element 118 to the control shaft 128 of the force controller 182 when the control shaft 128 is at least partially disposed in the coupling feature 140. For example, when the coupling feature 140 includes an aperture, the retention feature 142 may include a screw, set screw, pin, or similar fastener configured to couple the valve element 118 to the control shaft 128. In the exemplary embodiment of the valve element 118 illustrated in FIGS. 3A-3D, the coupling feature 140 includes an aperture in the body 119 of the valve element 118 and the retention feature 142 includes a set screw. In operation, once the control shaft 128 of the force controller 182 is inserted in the coupling feature 140, the retention feature 142 may be tightened to create a friction fit with the control shaft 128 to removably couple the valve element 118 to the control shaft 128. It is contemplated that the control shaft 128 may include an aperture, indent, recess, slot, or similar complementary feature configured to at least partially receive the retention feature 142 when the valve element 118 is coupled to the control shaft 128. It is also contemplated that the coupling feature 140 may couple the valve element 118 to the control shaft 128, and the control shaft 128 may include complementary shapes. For example, the control shaft 128 may include a hexagonal shape, and the coupling feature 140 may include a complementary-shaped aperture. This may assist the force controller 182 in rotating or otherwise manipulating the valve element 118 via the control shaft 128.

The valve element 118 may further include a first protrusion 136 extending from the first surface 131 of the body 119. The valve element 118 may also include a second protrusion 138 extending from the second surface 133 of the body 119. Each of the first and second protrusions 136, 138 may generally include a spherical shape that is curved or rounded as it extends away from the first or second surfaces 131, 133 respectively. The first and second protrusions 136, 138 are positioned near the perimeter of the body 119 of the valve element 118. It is also contemplated that the first and second protrusions 136, 138 may be positioned such that the first and second protrusions 136, 138 are on opposing sides of the Axis-A or centerline of the body 119 when viewed orthogonally relative to either the first surface 131 or the second surface 133 of the body 119.

Each of the first and second protrusions 136, 138 may include a cut-out portion 132. For example, the first protrusion 136 may include a first cutout 132A and the second protrusion 138 may include a second cutout 132B. The first and second cutouts 132A and 132B may be configured such that they divide the first protrusion 136 into a first portion 136A and a second portion 136B and divide the second protrusion 138 into a first portion 133A and a second portion 133B. Because the first and second protrusions 136, 138 are generally spherical and curved-shaped, the resulting outer edge of each of the first and second portions 136A, 136B of the first protrusion 136 and each of the first and second portions 133A, 133B of the second protrusion 138 may include a generally curved outer edge. This allows the valve element 118 to be pivoted or rotated within a generally circular- or round-shaped interior chamber 130 of the valve body 112. The curved outer edges may alternatively be referred to as an outer valve surface 118A of the valve element 118 that defines an outer radial diameter, and hence a spherical profile, for the valve element.

Figure 3A:
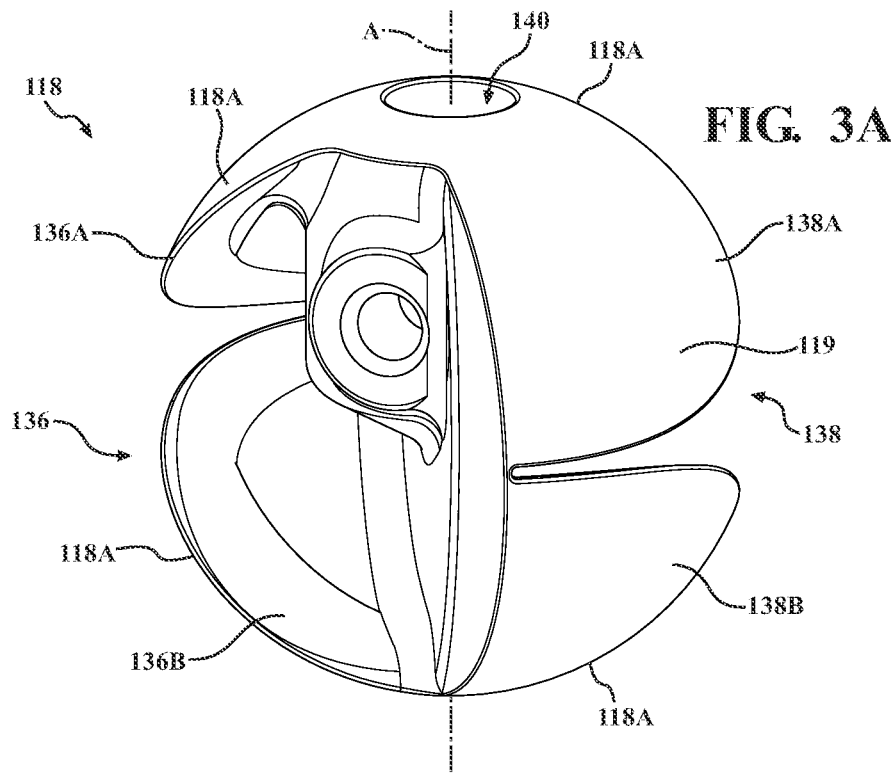
FIG. 3A shows a perspective view of a first configuration of a valve element for use in the valve assembly of FIG. 1.
Figure 3B:
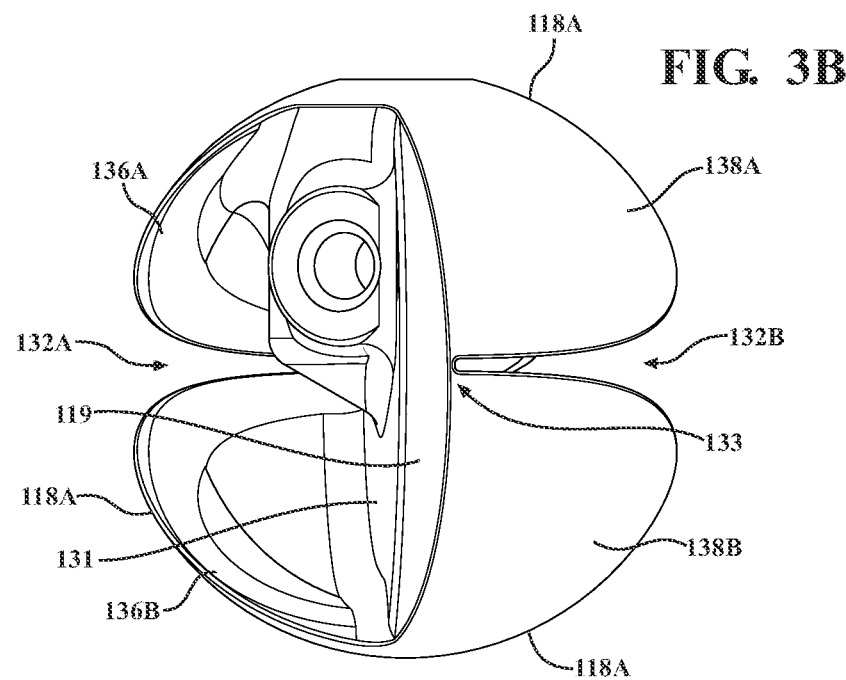
FIG. 3B shows a side view of FIG. 3A.
Figure 3C:
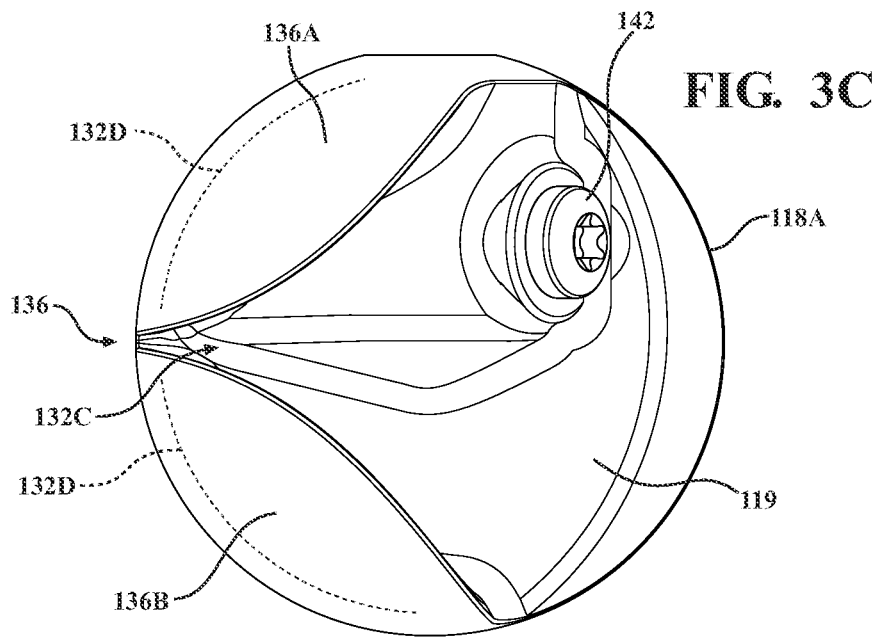
FIG. 3C shows a front view of FIG. 3A.
Figure 3D:
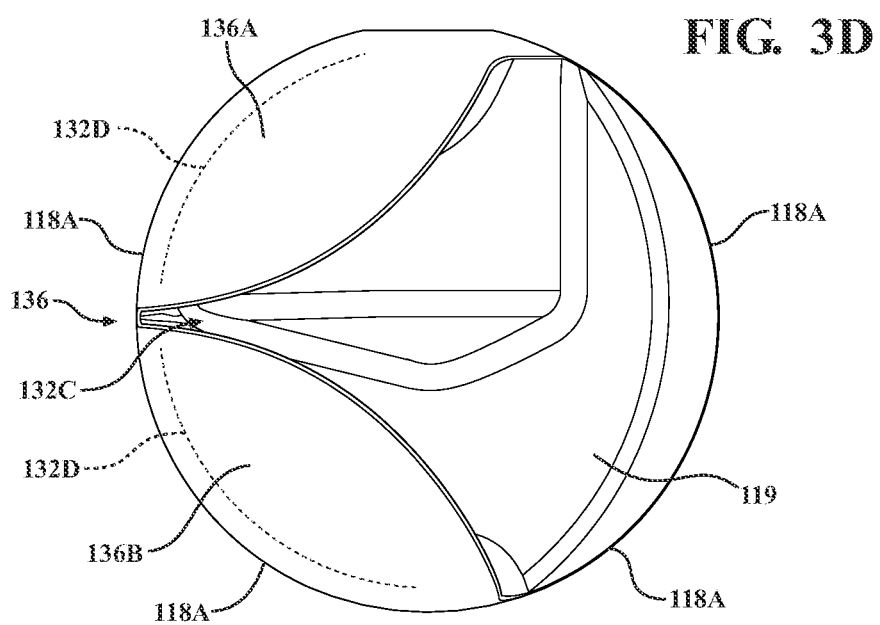
FIG. 3D shows a rear view of FIG. 3C.

Referring to FIGS. 3C and 3D, a front and rear view of the flow control 118 is illustrated, showing the shape of the cutout 132A in the second protrusion 138 forming the first portion 133A and the second portion 133B. When viewed orthogonally relative to the second surface 133 of the body 119, it can be seen that the cutout 132A includes a generally arch-shaped cutout that projects outward from the second surface 133 and removes a portion of the second protrusion 138. The vertex or point 135 is generally positioned at or near the perimeter or outer edge of the body 119 to define the first portion 133A and the second portion 133B of the protrusion 138 on opposing sides of the vertex 135. As shown in the exemplary configuration of FIGS. 3A-D, the arched-shaped cutout 132C is shown as being generally convex to create one fluid flow rate through the valve assembly 110, and in particular a linear fluid flow rate, based on the position of the valve element 118 within the interior chamber 130. By contrast, it is also contemplated that the arched-shaped cutout 132C may be generally concave, as illustrated FIGS. 3C and 3D using dotted lines (see reference 132D). This would create a second fluid flow rate, and in particular a second linear fluid flow rate, through the valve assembly 110 based on the position of the valve element 118 within the interior chamber 130.

While not illustrated, additional profiles for the cutout 132 of the first and the second protrusions 136, 138 are contemplated. Generally, any shape may be projected out orthogonally from the first or second surfaces 131, 133 of the body 119 of the valve element 118 to remove a portion of the first and/or second protrusions 136, 138 to modify the flow profile of fluid through the valve body 112 based on the position of the valve element 118 within the interior chamber 130. For example, in one alternative configuration, the cutout 132A can be formed as a V-shaped cutout or triangularly-shaped cutout that includes straight lines meeting at a vertex or point.

While an exemplary configuration of a V-shaped cutout 132A has a first angle, it is contemplated, as illustrated using dotted lines, that the angle of the V-shaped cutout 132A may be varied. As will be discussed in greater detail below, this will allow for changes to be made to the fluid flow rate through the valve assembly 110 based on the profile of the first and second protrusions 136, 138 of the valve element 118 based on size and/or shape of the cutout 132A and the position of the valve element 118 within the interior chamber 130.

Referring now to FIGS. 4-8, various configurations of the valve seat 210 for use in the valve assembly 110 are shown and described below. The valve seat 210, in accordance with any of the exemplary embodiments described below, is a compliant interface between the valve body 112 and the valve element 118 and is designed to accommodate dimensional changes over wide temperature ranges (i.e., −40° F. to 150° F. (−40° C. to 66° C.)). Contact between the outer surface 118A of the valve element 118 and the valve seat 210 only at limited locations (further defined below) reduces the amount of friction which must be overcome and resultant wear on components of the valve assembly 110. The valve seat 210 design is balanced (symmetrical) such that the valve element 118 is not placed into rotation or bending permitting the use of inexpensive d-stem type connections.

Preferably, the fluid flow through the valve assembly 110 between the valve element 118 and valve seat 210, in accordance with the exemplary embodiments, achieves a linear flow profile as the valve element 118 moves through a plurality of arcuate positions between and including a first, or closed, position (see FIG. 10A below) and one or more open positions (see three representative positions shown in FIGS. 10B-D below alternatively referred to as a second position, a third position and a fourth position). The term "linear" as in "linear fluid flow rate" refers to the incremental additional fluid flow that occurs as the valve element 118 is opened from the closed position through each of the one or more open positions, wherein a graph comparing flow right to percentage of opened position would generate a linear flow profile from the closed position to the maximum open position.

FIGS. 4-8 illustrate three exemplary embodiments of the valve seat 210 for use in the valve assembly 110 in accordance with the present disclosure.

In each of the exemplary embodiments of FIGS. 4-8, the valve seat 210 includes a cylindrical body portion 212 having an inner seat surface 214 and an opposing outer seat surface 216 and defining a clearance hole 220 extending from the inner seat surface 214 and the opposing outer seat surface 216 for receipt of the control shaft 128 therethrough. A wiper or similar functioning obstruction can be provided adjacent to the clearance hole 220 to minimize bypass flow as needed. In addition, the valve seat 210 of each of the embodiments of FIGS. 4-8 includes at least one seal 240 that is disposed around the outer seat surface 216 that is sealingly coupled to the inner body surface 112a of the valve body 112 between the fluid inlet 114 and fluid outlet 116.

The inner seat surface 214 defines a cylindrical line axis 225 that is coextensive with an imaginary plane extending through a length of the control shaft 218 and bisecting the cylindrical body portion 212. The cylindrical line axis 225, as illustrated in FIGS. 4-7, also bisects the clearance hole 220. In each of the exemplary embodiments, at least a portion of an outer surface 119 of the valve element 118 maintains contact with the inner seat surface 214 of the cylindrical body portion 212 along the circumferential line axis 225 during movement of the valve element 212 through the arcuate range of positions between the closed and open positions (as best shown in FIGS. 9A-9D, described in further detail below).

The cylindrical body portion 212 consists of a thin (~1 mm or less) cylindrical material, preferably plastic with acceptable dimensional stability and self-lubricating properties. The valve seat 210 preferably is formed from a synthetic polymer with suitable hardness and self-lubricating properties to minimize friction. The most basic material used to form the cylindrical body portion 212 would be a synthetic polyamide like nylon (such as nylon 6 or nylon 6,6) for its availability, toughness and lubricity. For a more dimensionally stable version, and to decrease friction, the valve seat 210 is preferably formed from a PTFE (i.e., polytetrafluoroethylene, commonly referred to as Teflon)/polyamide compounds such as those sold commercially under the tradenames Ultramid® (available from BASF Corporation of Florham Park, N.J.) and Tecasint® (available from Boedeker Plastics, Inc. of Shiner Tex.) which provide the excellent lubricating properties of PTFE with the more elastic and creep resistant properties of a synthetic polyamide like nylon. In still further embodiments, the cylindrical body portion may be formed from a PTFE/polyimide compounds such as those sold commercially under the tradename T-Smart® PTFE (available from T-Lon Products, Inc. of Hartland, Wis.). One exemplary PTFE/polyimide compounds for used in the cylindrical body portion 212 is T-Lon-37, available from T-Lon Products, Inc. of Hartland, Wis., which is described as a "polyimide filled PTFE" material (which has a tensile strength of 3000 PSI (ASTM D4894/D4745), an elongation of 225% (ASTM D4894/D745), a specific gravity of 1.99 (ASTM D4894/D745), and a Shore D hardness of 57 (ASTM D2240) which also provides the excellent lubricating properties of PTFE with the more elastic and creep resistant properties of a synthetic polyimides similar to polyamides like nylon. Still further exemplary embodiments of PTFE/polyamide or PTFE/polyimide compounds may include tensile strengths varying from about 2000-4000 PSI, elongations of 175-275%, specific gravities of 1.75-2.25, and Shore D hardness values ranging from 50 to 80 are also contemplated in addition to the specific exemplary embodiments described above.

Figure 4:
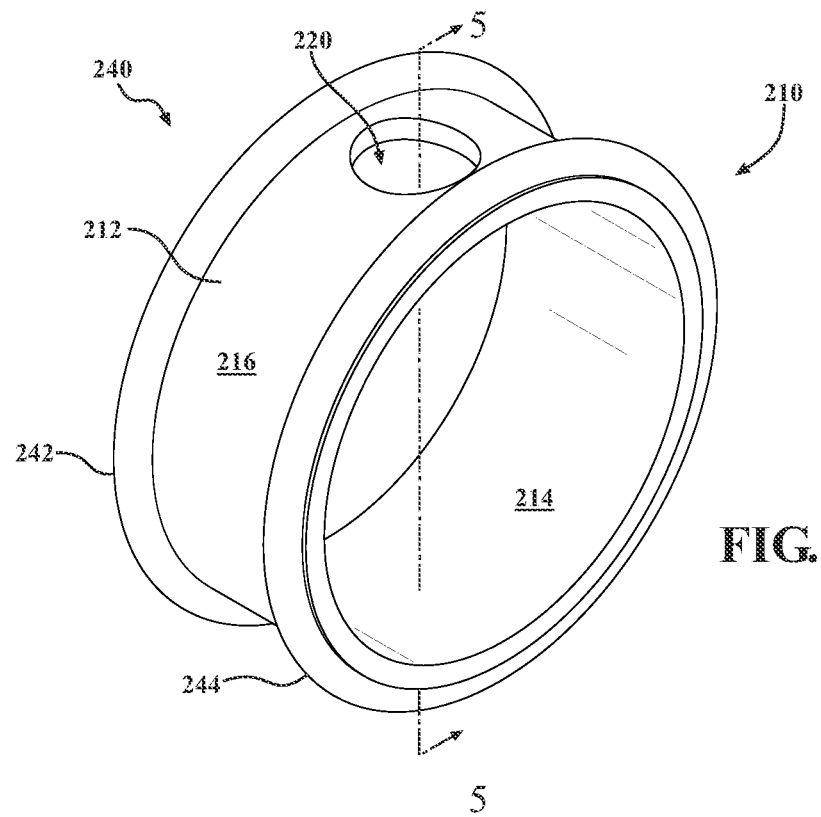
FIG. 4 shows a perspective view of a valve seat having a pair of seal members in accordance with one exemplary embodiment for use in the valve assembly of FIG. 1.
Figure 5:
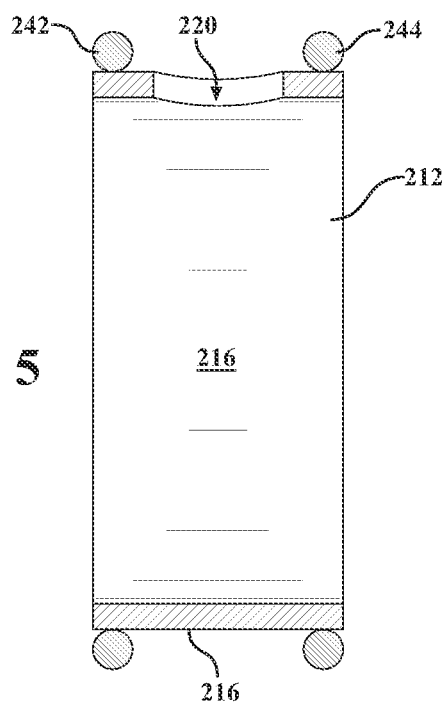
FIG. 5 show a side section view of FIG. 4 taken along line 5-5.

In certain embodiments, such as shown in FIGS. 4 and 5, the at least one seal 240 is in the form of a pair of seal rings 242, 244, that are disposed around the outer seat surface 216 of the valve seat 210, and preferably coupled to or otherwise secured to, the outer seat surface 216 of the plastic valve seat 210 such that installation and the application of pressure will not affect their situation on the cylinder body portion 212 perimeter.

The seal rings 242 and 244 can be O-rings manufactured from common synthetic rubber compounds such as Nitrile (Buna-N, NBR, nitrile butadiene rubber) sold under such names as Perbunan, Nipol, Krynac, Breon. Preferably, the seal rings 242 and 244 are disposed around the outer perimeter of the valve seat 210 and coupled to the plastic valve seat 210 such that installation and the application of pressure will not affect their situation on the cylinder perimeter.

Figure 6A:
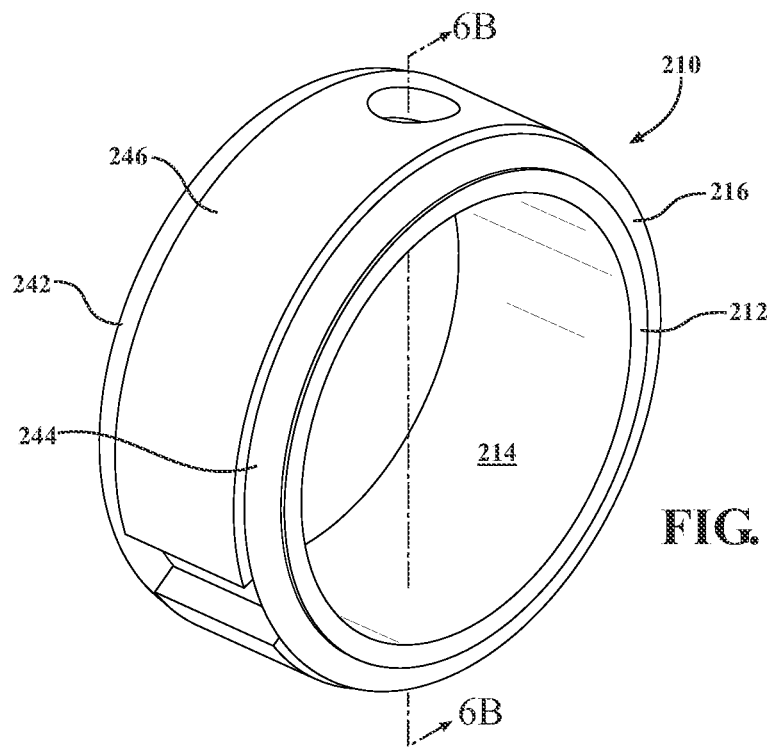
FIG. 6A shows a perspective view of an alternative exemplary embodiment of the valve seat including an over-molded ring portion coupled to the valve seat of FIG. 4 between the pair of seal members.
Figure 6B:
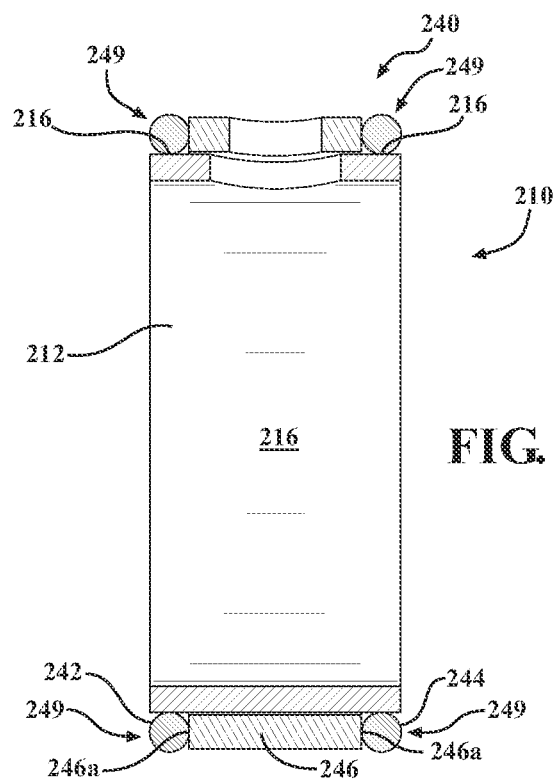
FIG. 6B shows a side section view of FIG. 6A taken along line 6B-6B.

Alternatively, as shown in FIGS. 6A and 6B, the seal 240 could also include an overmolded portion 246 that is positioned the cylindrical body portion 212 and made from a Thermoplastic vulcanizate or synthetic EPDM such as Santoprene, Keltan or Vistalon. In certain embodiments, the overmolded portion 246 is a separate molding from the respective seal rings 242 and 244 and are disposed between the seal rings 242 and 244. In these embodiments, the outer surface 246A of the overmolded portion 246 the outer seat surface 216 of the cylindrical body portion 212 adjacent to the edge create a cylindrical pocket 249 that is sized to accept a respective one of the seal rings 242, 244.

In certain embodiments, the overmolded portion 246 is coupled to each of the seal rings 242, 246. Still further, in certain embodiments, the overmolded portion 246 is formed as a single piece construction with the seal rings 242, 244 (i.e., the overmolded portion 246 is integrally formed with the seal rings 242, 244).

Referring back to the exemplary embodiment in FIGS. 4 and 5, the valve seat 210 is continuous in its cylindrical shape, and therefore does not have ends in the form of joint or an overlap. In other words, the inner and outer surfaces 214, 216 are continuous around the cylindrical shape, with the only break in the cylindrical shape being the clearance hole 220 as defined above, and thus the valve seat 210 may hereinafter be referred to a true continuous cylinder.

Figure 9:
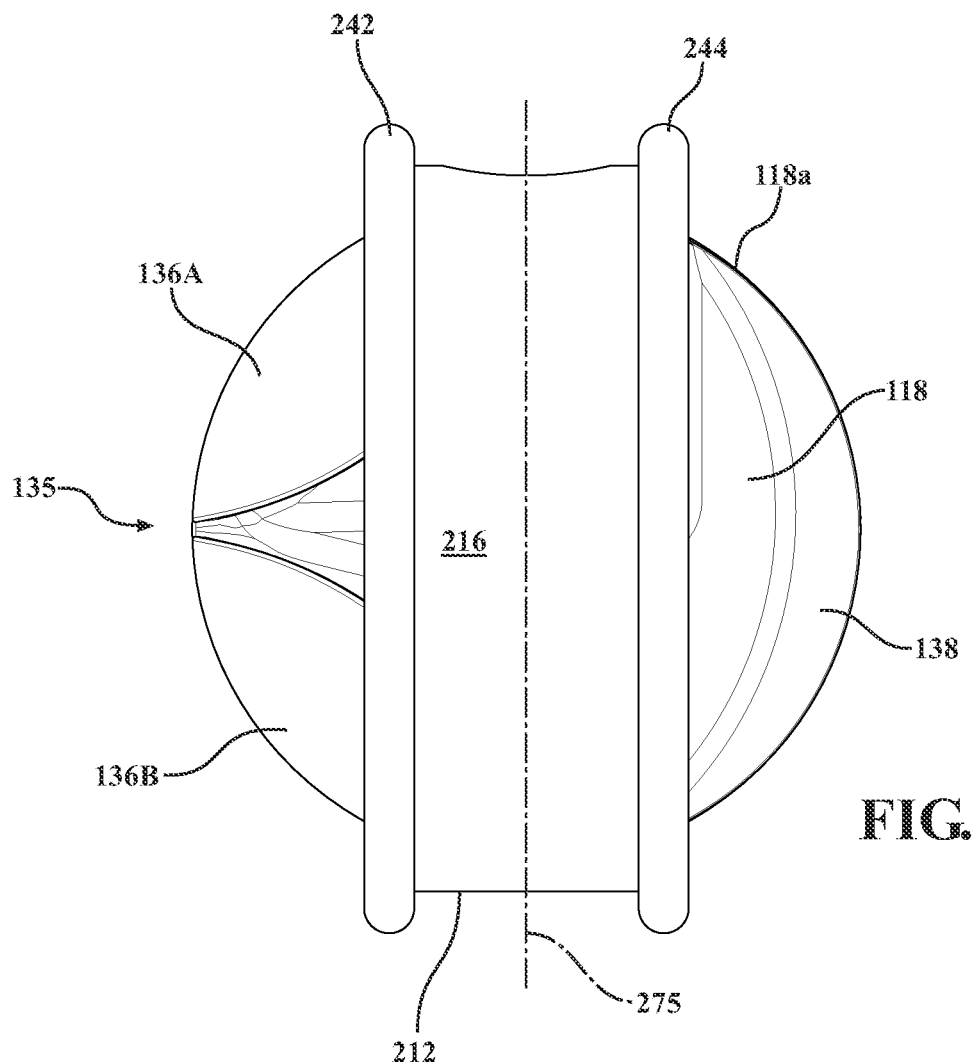
FIG. 9 show side view of the valve element according to FIGS. 3A-D contained within the valve seat of FIG. 4 which are elements of the valve assembly of FIG. 1 in accordance with one exemplary embodiment.

In these embodiments, the material used to form the cylindrical body portion 212, as described above, allows the inner radial diameter defined by the inner seat surface 214 to shrink or grow around the installed valve element 118 to maintain a circumferential line of contact 275 with a portion of the outer surface 119 of the valve element 118, such as shown in FIG. 9.

Accordingly, the properties of the material used in the cylindrical body portion 212 allows for minute inner radial adjustments to accommodate the size of a valve element 118 in which the outer radial diameter of the outer valve surface 118a is slightly larger, or slightly smaller, than the inner radial diameter defined by the inner seat surface 214 during its manufacturing process. In addition, the properties of the material used in the cylindrical body portion 212 allows for minute inner radial adjustments during operation of the valve assembly 110, in which the valve element 118 may shrink or grow slightly as a function of temperature increase or decrease prior to or during the operation of the valve assembly 110, such as at temperatures ranging from −40° C. to 66° C. so as to correspond to the dimensional stability of the material used in the valve seat 210 as described above.

In alternative exemplary embodiments, as opposed to the embodiments shown in FIGS. 4 and 5 wherein the cylindrical body portion 212 is continuous in its cylindrical shape, the cylindrical body portion 212 could be not continuous in its cylindrical shape and include a relief feature which allows the inner radial diameter defined by the inner seat surface 214 to shrink or grow around the installed spherical radius to maintain the circumferential line of contact 275.

Figure 7A:
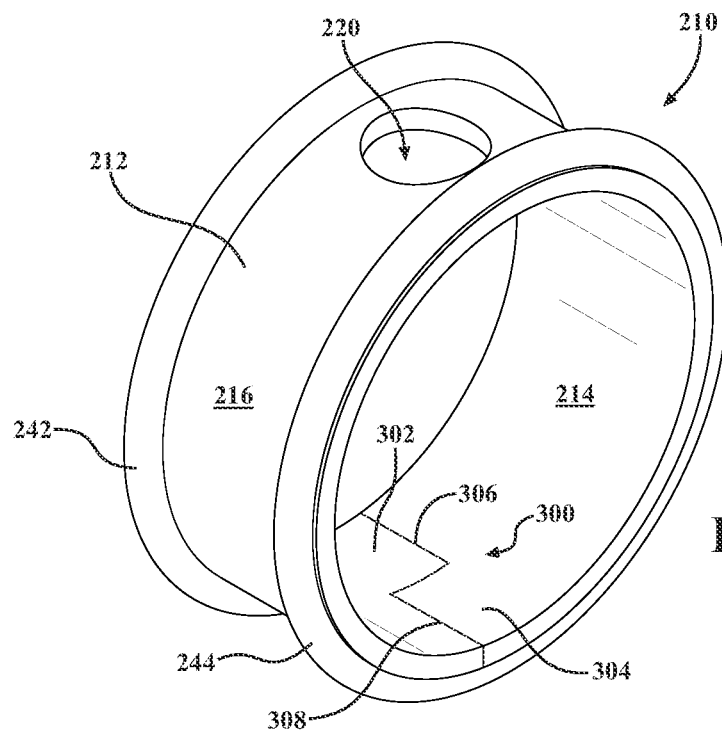
FIG. 7A shows a perspective view of an alternative exemplary embodiment of the valve seat including a lap joint in a first position.
Figure 7B:
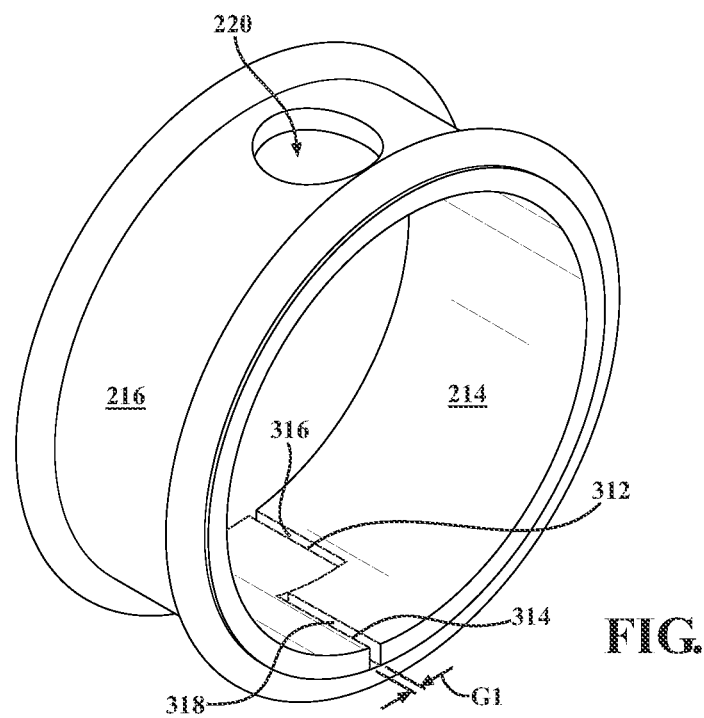
FIG. 7B shows a perspective view of the valve seat of FIG. 6A in a second position.
Figure 8A:
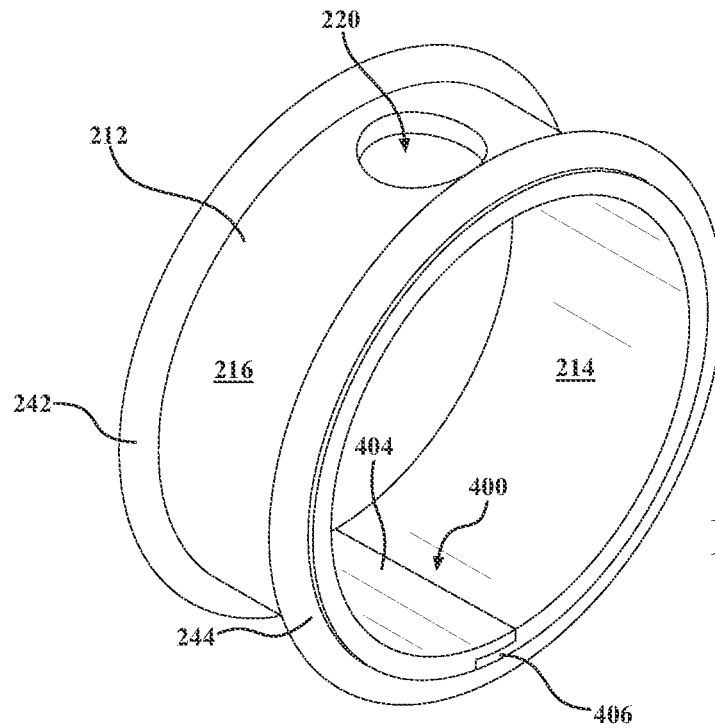
FIG. 8A shows another perspective view of another alternative exemplary embodiment of the valve seat including where opposing ends of the cylindrical ring portion overlap in a first position.
Figure 8B:
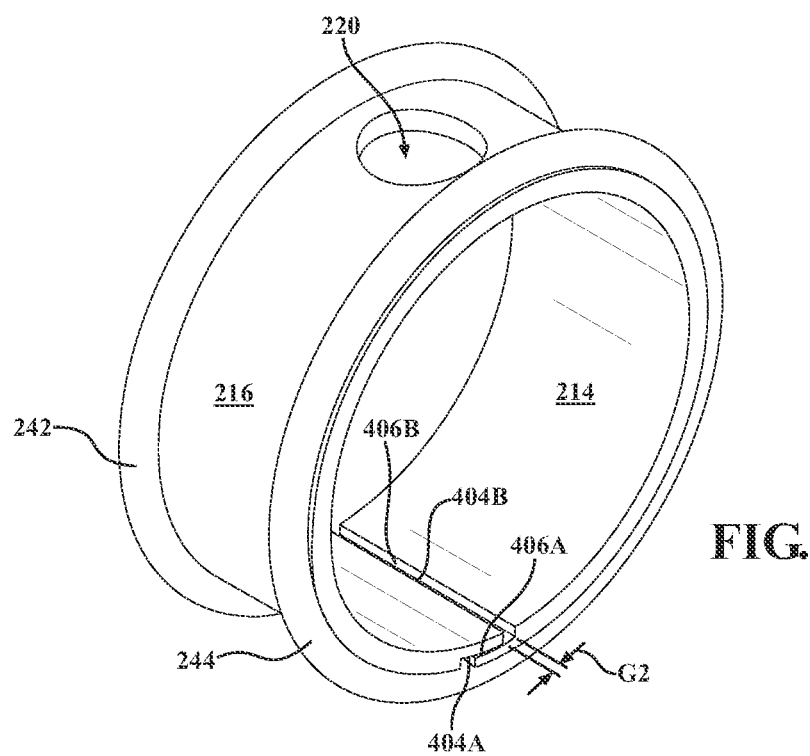
FIG. 8B shows a perspective view of the valve seat of FIG. 7A in a second position.

In particular, in certain embodiments, the cylindrical body portion 212 includes two ends that either form a lap joint 300 therebetween (see FIGS. 7A and 7B) or an overlap 400 (see FIGS. 8A and 8B).

Referring first to FIGS. 7A and 7B, the cylindrical body portion 212 is formed as including a first end 302 and a second end 304, which an edge surface 306 of the first end 302 shaped to correspond to the shape of the edge surface 308 of the second end 304.

The lap joint 300 allows the inner radial diameter of the inner seat surface 214 of the cylindrical body portion to be adjusted from a minimum value (see FIG. 7A) to a maximum value (7B) based upon the size of the gap G1 created between the edge surface 306 and the edge surface 308.

Accordingly, in addition to the properties of the material used in the cylindrical body portion 212 that allow for minute inner radial adjustments to accommodate the size of a valve element 118, the use of a non-continuous cylindrical shape allows for larger scale adjustments of the inner radial diameter of the inner seat surface 214 during operation of the valve assembly 110 than those provided by the properties of the material of the cylindrical body portion 212 alone, in which the valve element 118 is manufactured slightly larger or smaller than the present inner radial diameter of the inner seat surface 214 or in instances where the valve element 118 may shrink or grow slightly as a function of temperature increase or decrease prior to or during the operation of the valve assembly 110, as described above. In particular, the larger the outer radial diameter of the outer valve surface 118a of the valve element 118, the larger the increase in the gap G1 of the cylindrical body portion 212 becomes, via a self-adjustment of the inner radial diameter of the inner seat surface 214, to accommodate by maintaining a portion of the inner seat surface 214 of the valve seat in contact with (i.e., remains conformed to) the outer valve surface 118a of the valve element 118 as the valve element 118 moves through the range of positions between and including the closed position and any one open position. Stated another way, a portion of the inner seat surface 214 of the valve seat 210 remains conformed to the outer valve surface 118a of the valve element 118 as the valve element 118 moves through the range of positions between and including the closed position and any one open position over the wide temperature range (at temperatures ranging from −40° C. to 66° C.) and due to dimensional tolerance differences that may be present in the valve element 118.

In certain embodiments, such as shown in FIGS. 7A and 7B, the lap joint 300 has a jagged profile having a pair of steps 306, 308, in which a first outer edge portion 312 of the first edge 306 is mated to a first outer edge portion 316 of the second end 304 and in which a second outer edge portion 314 of the first edge 306 is positioned adjacent to a second outer edge portion 318 of the second edge 308.

In any of these embodiments, the clearance hole 250 may be anywhere relative to the lap joint (300), such as 180 degrees around the cylindrical body portion 212 as shown in FIGS. 7A and 7B. A wiper or similar functioning obstruction can be provided over the lap joint 300 to minimize bypass flow as needed, particularly when the gap G1 is created.

A further alternative would include wherein the ends 402, 404 of the cylindrical body portion 212 have cross-sections of different shapes, and in which the ends 402, 404 are overlapped with respect to each other such that the first end 302 is disposed radially inwardly and overlapping with respect to the second end 304 to form an overlap 400 as shown in FIGS. 8A and 8B.

In particular each of the first end 404 and second end 406 are formed with a respective cutout so that, when overlapped, the inner seat surface 214 and outer seat surface 216 of the cylindrical ring are continuous and in which the thickness of the cylindrical body portion 212, measured between the inner seat surface 214 and outer seat surface 216, remains constant in the overlap 400. Accordingly, the lower surface 404A defines the length of the cutout of the first end 404, while the upper surface 406A defines the length of the corresponding cutout of the second end 406.

Similar to the embodiment of FIGS. 7A and 7B, the cylindrical body portion 212 can self-adjust the inner radial diameter of the inner seat surface 214 by increasing or decreasing the size of a gap G2 between the edge surface 404B of the first end 404 and the edge surface 406B of the second end 404 in which the valve element 118 is manufactured slightly larger or smaller than the present inner radial diameter of the inner seat surface 214 or in instances where the valve element 118 may shrink or grow slightly as a function of temperature increase or decrease prior to or during the operation of the valve assembly 110, as described above. The size of the gap G2 corresponds to the length of overlap and may be referred to interchangeably herein. In particular, the larger the outer radial diameter of the outer valve surface 118a of the valve element 118, the larger the increase in the gap G2 of the cylindrical body portion 212 becomes, via a self-adjustment of the inner radial diameter of the inner seat surface 214 by sliding the lower surface 404A of the first end 404 along the upper surface 406A the second end 406 to increase or decrease the size of the gap G2, to accommodate by maintaining a portion of the inner seat surface 214 of the valve seat 210 in contact with the outer valve surface 118a of the valve element 118 as the valve element 118 moves through the range of positions between and including the closed position and any one open position.

In any of these embodiments, the clearance hole 250 may be anywhere relative to the lap joint (300), such as 180 degrees around the cylindrical body portion 212 as shown in FIGS. 7A and 7B. A wiper or similar functioning obstruction can be provided over the lap joint 300 to minimize bypass flow as needed, particularly when the gap G1 is created.

Referring to FIGS. 10A-10D, an exemplary configuration of a valve assembly 110 including a valve element 118 oriented at various positions within the valve body 112 is illustrated. Each of FIGS. 10A-10D illustrates the valve assembly 110 from the perspective of looking into the interior chamber 130 of the valve body 112 through the inlet 114. As described above, the valve element 118 includes the first and second protrusions 136, 138 extending from the body 119 on opposing sides of the axis, Axis-A, defined by the coupling feature 140. A cutout 132A, 132B is formed in each of the first and second protrusions 136, 138 to define the first portion 136A, 133A and the second portion 136B, 133B of each of the first and second protrusions 136, 138, respectively. As described above, the valve assembly 110 may include a force controller 182 (not shown in FIGS. 4A-4E) coupled to the valve element 118 by the control shaft 128 (not shown in FIGS. 4A-4E). The force controller 182, via the control shaft 128, may be configured to rotate the valve element 118 within the interior chamber 130 about an axis, Axis-A, defined by the control shaft 128 and/or the coupling feature 140 of the valve element 118. The force controller may be programmed to move/rotate the valve element 118 via the control shaft 128 in any number of increments and/or degrees to provide a precise fluid flow rate through the interior chamber 130. By using a configuration of the valve element 118 that includes the first and second protrusions 136, 138, including cutouts 132A, 132B, 132C, the fluid flow rate through the interior chamber 130 may allow the valve assembly 110 to produce a generally linear profile for the flow rate compared to the valve position, resulting in a constant gain or efficiency of the valve assembly 110 across the various positions of the valve element 118. Whereas a generic butterfly valve comprising a simple disc-shaped valve member typically produces a curved/non-linear profile with regard to the flow rate compared to the valve position create peaks and valleys in terms of gains and/or efficiency of the valve across the various positions of the valve member.

Figure 10A:
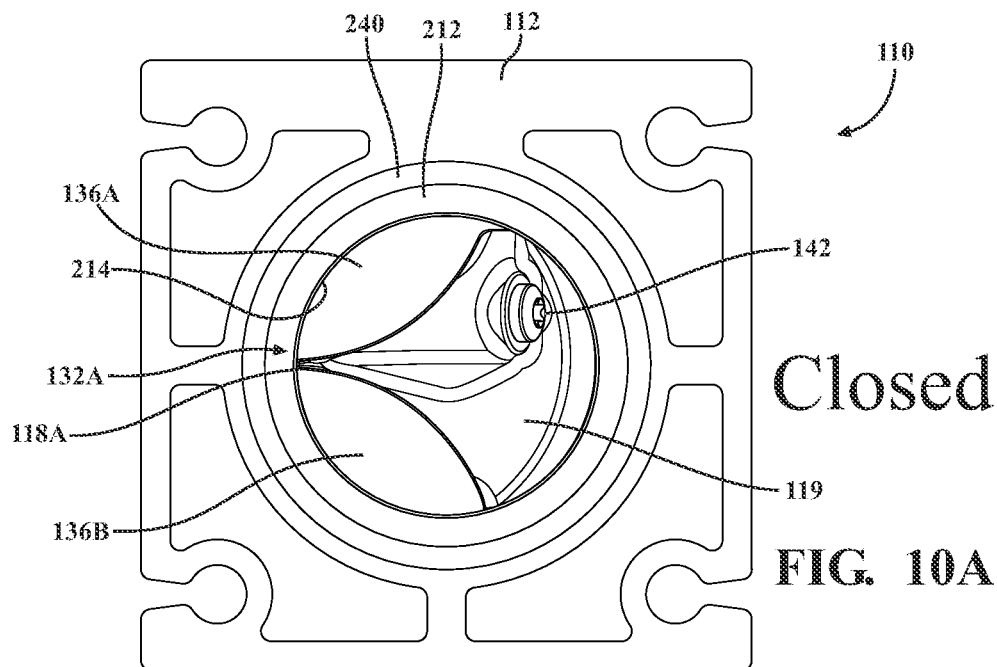
FIG. 10A shows a front view of the valve assembly of FIG. 1 including the valve of FIGS. 3A-D contained within the valve seat of FIG. 4 in a first position.

As illustrated in FIG. 10A, the valve element 118 is oriented in a closed position by the force controller 182. In the closed position, the valve element 118 is positioned such that the maximum portion of the outer valve surface 118a of the valve element 118 is in contact with the inner seat surface 214 of the valve seat 210, therein restricting flow between the fluid inlet 114 and fluid outlet 116 through the interior chamber 130 and between the valve element 118 and valve seat 210.

Figure 10B:
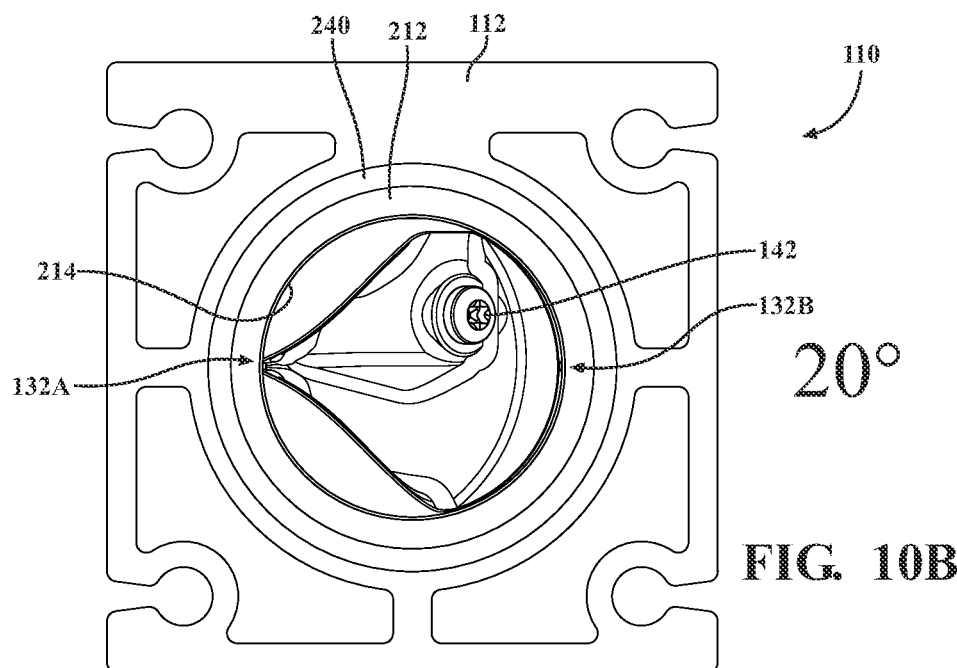
FIG. 10B shows a front view of the valve assembly of FIG. 1 including the valve element of FIGS. 3A-D contained within the valve seat of FIG. 4 in a second position.

Referring to FIG. 10B, the valve element 118 is rotated approximately 20 degrees relative to the closed position by the force controller 182. Only a slight or marginal opening is created where the cutout 132A in the second protrusion 138 meets the perimeter or outer valve surface 118a of the body 119 of the valve element 118.

Figure 10C:
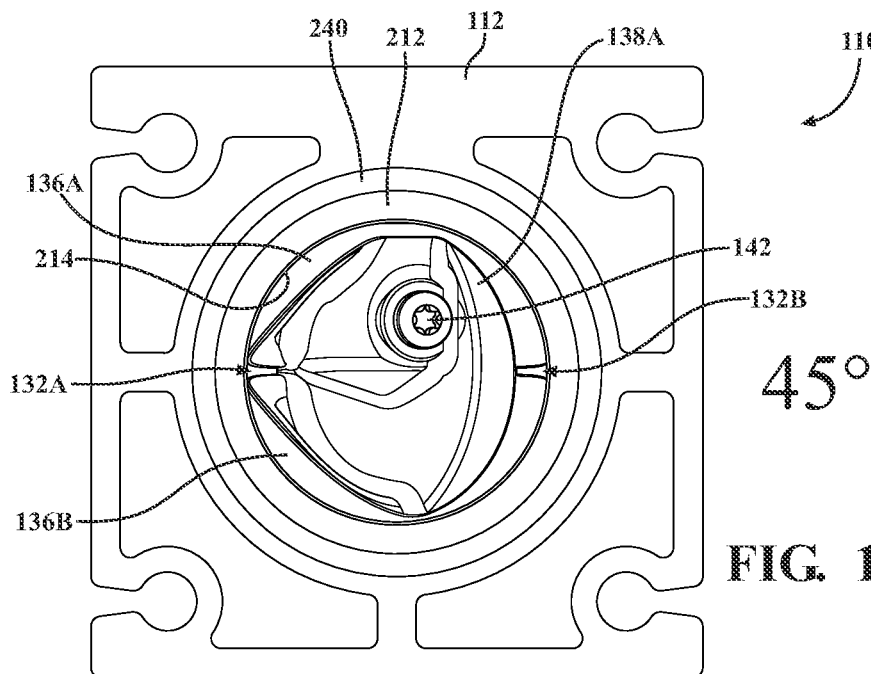
FIG. 10C shows a front view of the valve assembly of FIG. 1 including the valve element of FIGS. 3A-D contained within the valve seat of FIG. 4 in a third position.

Referring to FIG. 10C, the valve element 118 is rotated approximately 45 degrees relative to the closed position by the force controller 182. A slightly larger opening is created where the cutouts 132A, 132B in the first and second protrusions 136, 138 each meet the perimeter or outer valve surface 118a of the body 119 of the valve element 118. The opening has a generally arch shape.

Figure 10D:
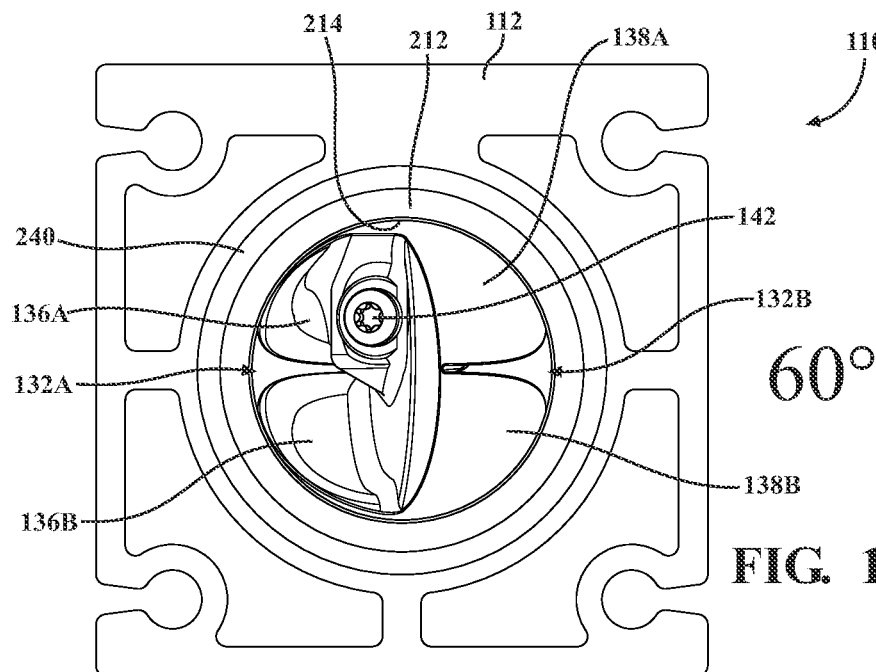
FIG. 10D shows a front view of the valve assembly of FIG. 1 including the valve element of FIGS. 3A-D contained within the valve seat of FIG. 4 in a fourth position.

Referring to FIG. 10D, the valve element 118 is rotated approximately 60 degrees relative to the closed position by the force controller 182. A larger opening is created where the cutouts 132A, 132B in the first and second protrusions 136, 138 each meet the perimeter or outer edge of the body 119.

Notably, in accordance with the exemplary embodiments shown in FIGS. 10B-D, the fluid flow rate increases between the fluid inlet 114 and fluid outlet 116 through the interior chamber 130 and between the valve element 118 and valve seat 210 in a linear flow pattern corresponding to each degree in which the valve element 118 is rotated away from the closed position as shown in FIG. 10A.

While not shown, the valve element 118 may also be rotated approximately 90 degrees relative to the closed position by the force controller 182. Depending on the size and/or shape of the cutouts 132A, 132B and/or the first and second protrusions 136, 138, this may be the largest opening that is created by the valve element 118 within the interior chamber 130, producing the maximum fluid flow rate.

While various orientations of the valve element 118 within the interior chamber 130 of the valve assembly 110 are illustrated in FIGS. 10A-D, additional positions and/or orientations are contemplated. For example, the force controller 182 may be configured to step/rotate the control shaft 128, and by extension the valve element 118, in two degree increments. Alternatively, the force controller 182 may be configured to step/rotate the control shaft 128, and by extension the valve element 118, in five-degree increments, ten degree increments, or any other variation thereof.

It should be noted that a generic flow control gate without the protrusions and or cutouts would show a much greater change in the size of the opening created in the interior chamber as the flow control gate was moved from 45 degrees to 60 degrees. This distinction illustrates how the cutouts 132A, 132B in the first and second protrusions 136, 138 provides for the fluid flow rate through the interior chamber 130 to be modified with greater precision. Furthermore, the size and/or shape of cutouts 132A, 132B in the first and second protrusions 136, 138 may allow for a generic step motor with set or standard uniform increments to create a generally linear profile for the flow rate compared to the valve position. By contrast, the step motor of a generic butterfly valve could not achieve a linear profile for the flow rate compared to the valve position using a step motor moving the valve in uniform increments.

The invention has been described in an illustrative manner. It is to be understood that the terminology which has been used is intended to be in the nature of words of description rather than of limitation. Many modifications and variations of the invention are possible in light of the above teachings. Therefore, within the scope of the appended claims, the invention may be practiced other than as specifically described.

What is claimed is:

1. A valve assembly comprising:
a valve body defining a fluid inlet in fluid communication with a fluid outlet, said valve body having an inner body surface defining an interior chamber extending between said fluid inlet and said fluid outlet;
a control shaft disposed in said interior chamber and coupled to said valve body for rotational movement relative to said valve body;
a valve element disposed in said interior chamber and coupled to said control shaft for movement in conjunction with said control shaft relative to said valve body through a range of positions between and including a closed position and an open position, said valve element having an outer valve surface defining an outer radial diameter; and
a valve seat disposed in said interior chamber and comprising:
a cylindrical body portion having an inner seat surface and an opposing outer seat surface, said cylindrical body portion defining a clearance hole extending from said inner seat surface and said opposing outer seat surface for receipt of said control shaft, said inner seat surface defining an inner radial diameter, and
at least one seal disposed around said opposing outer seat surface sealingly coupling said valve seat to said valve body,
wherein said cylindrical body portion is formed from a polymeric material which maintains dimensional stability at temperatures ranging from −40° C. to 66° C. and which is configured to self-adjust said inner radial diameter to correspond to said outer radial diameter of said valve element to maintain a portion of said inner seat surface in contact with said outer valve surface of said valve element through said range of positions.

2. The valve assembly according to claim 1, wherein the self-adjustment of said inner radial diameter of said cylindrical body portion to maintain a portion of said inner seat surface in contact with said outer surface of said valve element permits said valve assembly to regulate a flow of a fluid in said interior chamber between fluid inlet and fluid outlet and between said valve element and said valve seat according to a linear flow profile through said range of positions.

3. The valve assembly according to claim 1, wherein said inner seat surface defines a cylindrical line axis which is coextensive with a plane extending through a length of said control shaft and bisecting said cylindrical body portion, and wherein said portion of said inner seat surface corresponding to said circumferential line axis is maintained in contact with said portion of said outer surface of said valve element through said range of positions.

4. The valve assembly according to claim 1, wherein said polymeric material comprises a polyimide-filled polytetrafluoroethylene compound.

5. The valve assembly according to claim 1, wherein said cylindrical body portion is continuous along a radial length.

6. The valve assembly according to claim 1, wherein said cylindrical body portion is non-continuous along a radial length and further has a first end and a second end which collectively define a lap joint therebetween, wherein said lap joint defines a gap between said first end and said second end with said first end and said second end configured to self-adjust said gap to adjust said inner radial diameter to correspond to said outer radial diameter of said valve element to maintain a portion of said inner seat surface in contact with said outer surface of said valve element through said range of positions.

7. The valve assembly according to claim 1, wherein said cylindrical body portion is non-continuous along a radial length and further has a first end and a second end with said first end disposed radially inwardly and overlapping said second end, wherein said cylindrical body is configured to self-adjust a length of overlap of said first end relative to said second end to adjust said inner radial diameter to correspond to said outer radial diameter of said valve element to maintain a portion of said inner seat surface in contact with said outer surface of said valve element through said range of positions.

8. The valve assembly according to claim 1, wherein one seal of said at least one seal comprises an elastomeric o-ring.

9. The valve assembly according to claim 1, wherein said at least one seal comprises:
a pair of elastomeric o-rings positioned onto the outer seat surface;
a sealing ring overmolded onto said outer seat surface of said cylindrical body portion and disposed between said pair of elastomeric o-rings, wherein said sealing ring is formed from a thermoplastic vulcanizate material or a synthetic rubber material comprising a copolymer of ethylene, propylene and non-conjugated diene monomers.

10. The valve assembly according to claim 9, wherein said outer seat surface of said cylindrical body portion and said sealing ring form a stepped recessed region sized to accept a corresponding one of said at least one o-rings.

11. A valve seat for use in a valve assembly, the valve assembly including a valve body defining a fluid inlet in fluid communication with a fluid outlet, the valve body having an inner body surface defining an interior chamber extending between the fluid inlet and the fluid outlet; a control shaft disposed in the interior chamber and coupled to the valve body for rotational movement relative to the valve body; and a valve element disposed in the interior chamber and coupled to the control shaft for movement in conjunction with the control shaft relative to the valve body through a range of positions between and including a closed position and an open position with the valve element having an outer surface defining an outer radial diameter,
said valve seat comprising:
a cylindrical body portion having an inner seat surface and an opposing outer seat surface, said cylindrical body portion defining a clearance hole extending from said inner seat surface and said opposing outer seat surface for receipt of said control shaft, said inner seat surface defining an inner radial diameter, and
at least one seal disposed around said opposing outer seat surface sealingly coupling said valve seat to said valve body,
wherein said cylindrical body portion is formed from a polymeric material which maintains dimensional stability at temperatures ranging from −40° C. to 66° C. and which is configured to self-adjust said inner radial diameter to correspond to the outer radial diameter of the valve element to maintain a portion of said inner seat surface in contact with the outer valve surface of the valve element through said range of positions.

12. The valve seat according to claim 11, wherein said polymeric material comprises a polyimide-filled polytetrafluoroethylene compound.

13. The valve seat according to claim 11, wherein said cylindrical body portion is continuous along a radial length.

14. The valve seat according to claim 11, wherein said cylindrical body portion is non-continuous along a radial length and further has a first end and a second end which collectively define a lap joint therebetween, wherein said lap joint defines a gap between said first end and said second end with said first end and said second end configured to self-adjust said gap to adjust said inner radial diameter to correspond to the outer radial diameter of the valve element to maintain a portion of said inner seat surface in contact with the outer surface of the valve element through the range of positions.

15. The valve seat according to claim 11, wherein said cylindrical body portion is non-continuous along a radial length and further has a first end and a second end with said first end disposed radially inwardly and overlapping said second end, wherein said cylindrical body is configured to self-adjust a length of overlap of said first end relative to said second end to adjust said inner radial diameter to correspond to the outer radial diameter of the valve element to maintain a portion of said inner seat surface in contact with the outer surface of the valve element through the range of positions.

16. The valve seat according to claim 11, wherein one seal of said at least one seal comprises an elastomeric o-ring.

17. The valve seat according to claim 11, wherein said at least one seal comprises:
a pair of elastomeric o-rings positioned onto the outer seat surface;
a sealing ring overmolded onto said outer seat surface of said cylindrical body portion and disposed between said pair of elastomeric o-rings, wherein said sealing ring is formed from a thermoplastic vulcanizate material or a synthetic rubber material comprising a copolymer of ethylene, propylene and non-conjugated diene monomers.

18. The valve seat according to claim 17, wherein said outer seat surface of said cylindrical body portion and said sealing ring form a stepped recessed region sized to accept a corresponding one of said at least one o-rings.

19. A method for controlling the flow of fluid through a valve assembly in a linear flow pattern, the valve assembly including a valve body defining a fluid inlet in fluid communication with a fluid outlet, the valve body having an inner body surface defining an interior chamber extending between the fluid inlet and the fluid outlet; a control shaft disposed in the interior chamber and coupled to the valve body for rotational movement relative to the valve body; and a valve element disposed in the interior chamber and coupled to the control shaft for movement in conjunction with the control shaft relative to the valve body through a range of positions between and including a closed position and an open position with the valve element having an outer surface defining an outer radial diameter; and a valve seat comprising a cylindrical body portion having an inner seat surface and an opposing outer seat surface, the cylindrical body portion defining a clearance hole extending from the inner seat surface and the opposing outer seat surface for receipt of the control shaft, the inner seat surface defining an inner radial diameter, the valve seat also comprising at least one seal disposed around said opposing outer seat surface for sealingly coupling said valve seat to the valve body, wherein the cylindrical body portion is formed from a polymeric material which maintains dimensional stability at temperatures ranging from −40° C. to 66° C., said method comprising:

moving the valve element from a first position of the range of positions to a second position of the range of positions to achieve a desired flow of fluid in the interior chamber between the valve element and the valve seat and between the fluid inlet and fluid outlet, wherein the inner radial diameter of the valve seat is self-adjusted during said moving of the valve element to maintain a portion of the inner seat surface in contact with the outer surface of the valve element as the valve element moves through the range of positions between the closed and open positions.

20. The method according to claim 19, wherein the cylindrical body portion is non-continuous along a radial length and includes a first end and a second end, and wherein said step of moving the valve element comprises:

moving the valve element from a first position of the range of positions to a second position of the range of positions to achieve a desired flow of fluid in the interior chamber between the valve element and the valve seat and between the fluid inlet and fluid outlet, wherein the inner radial diameter of the valve seat is self-adjusted by changing the relative location of the first end of the cylindrical body portion relative to the second end of the cylindrical body portion during said moving of the valve element to maintain a portion of the inner seat surface in contact with the outer surface of the valve element as the valve element moves through the range of positions between the closed and open position.

* * * * *